(12) United States Patent
Kato

(10) Patent No.: US 6,563,946 B2
(45) Date of Patent: May 13, 2003

(54) IMAGE PROCESSING APPARATUS AND METHOD

(75) Inventor: Masami Kato, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/848,876

(22) Filed: May 1, 1997

(65) Prior Publication Data

US 2001/0012397 A1 Aug. 9, 2001

(30) Foreign Application Priority Data

| May 7, 1996 | (JP) | 8-112507 |
| May 8, 1996 | (JP) | 8-113689 |
| Apr. 16, 1997 | (JP) | 9-099129 |

(51) Int. Cl.$^7$ ............................. G06K 9/36; G06T 5/00
(52) U.S. Cl. ..................... 382/166; 382/250; 382/274; 382/275
(58) Field of Search ................................ 382/166, 235, 382/250, 254, 274, 275, 199; 358/520, 539, 432, 433; 348/396, 488, 663, 712, 396.1, 666, 667

(56) References Cited

U.S. PATENT DOCUMENTS

| 4,626,898 A | * | 12/1986 | Baba et al. ................ 348/279 |
| 4,757,385 A | * | 7/1988 | Hieda ....................... 348/241 |
| 4,760,453 A | * | 7/1988 | Hieda ....................... 348/243 |
| 5,012,329 A | * | 4/1991 | Lang et al. ................ 348/667 |
| 5,341,442 A | * | 8/1994 | Barrett ..................... 382/166 |
| 5,510,835 A | * | 4/1996 | Nishizawa et al. ........ 348/272 |
| 5,786,871 A | * | 7/1998 | Penney ..................... 348/609 |
| 5,790,269 A | * | 8/1998 | Masoki et al. ............. 358/447 |
| 5,847,847 A | * | 12/1998 | Kosaka ...................... 358/508 |
| 5,974,190 A | * | 10/1999 | Maeda et al. .............. 382/274 |
| 6,380,973 B1 | * | 4/2002 | Kawahara .................. 348/220 |

FOREIGN PATENT DOCUMENTS

| JP | 7143487 | 6/1995 |
| JP | 7322266 | 12/1995 |
| JP | 818979 | 1/1996 |
| JP | 837663 | 2/1996 |

* cited by examiner

*Primary Examiner*—Jon Chang
(74) *Attorney, Agent, or Firm*—Fitzpatrick, Cella, Harper & Scinto

(57) ABSTRACT

An image processing apparatus comprises a) an input device for inputting color image data which is compression-encoded in a color difference system color space, b) a decoder for decoding the color image data input by the input device, c) a processor for executing correction processing to luminance component data of the color image data decoded by the decoder, and d) an encoder for encoding both the luminance component data processed by the processor, and color difference component data of the color image data output from the decoder. According to another embodiment of the invention, an image processing apparatus is provided which comprises a) an input device for inputting color image data which is compression-encoded in a color difference system color space, b) a decoder for decoding the color image data input by the input device, c) a processor for executing correction processing to luminance component data of the color image data decoded by the decoder, and d) a converter for performing a color space conversion on the basis of the luminance component data processed by the processor, and color difference component data of the color image data output from the decoder.

13 Claims, 16 Drawing Sheets

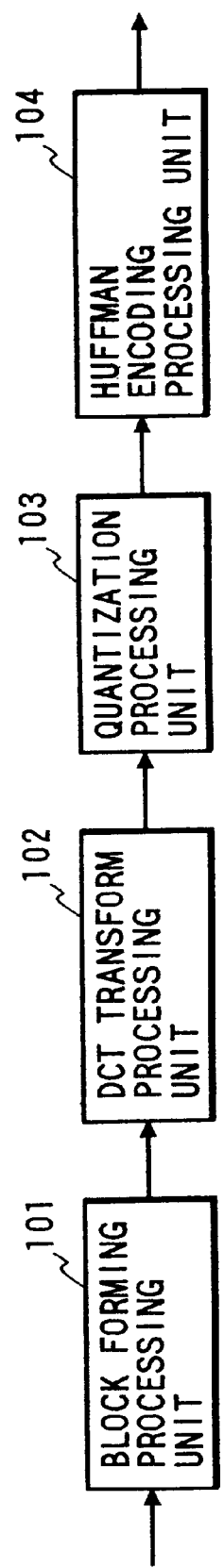
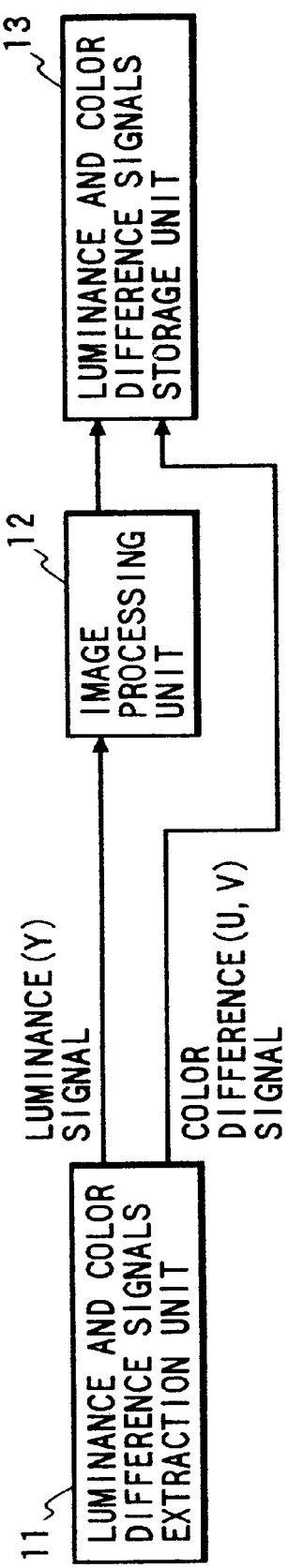

FIG. 7

→ MAIN SCANNING DIRECTION

SUBSCANNING DIRECTION ↓

|  | -1/4 |  |
|---|---|---|
| -1/4 | 2 | -1/4 |
|  | -1/4 |  |

FIG. 8

→ MAIN SCANNING DIRECTION

SUBSCANNING DIRECTION ↓

| P11 | P12 | P13 |
|---|---|---|
| P21 | P22 | P23 |
| P31 | P32 | P33 |

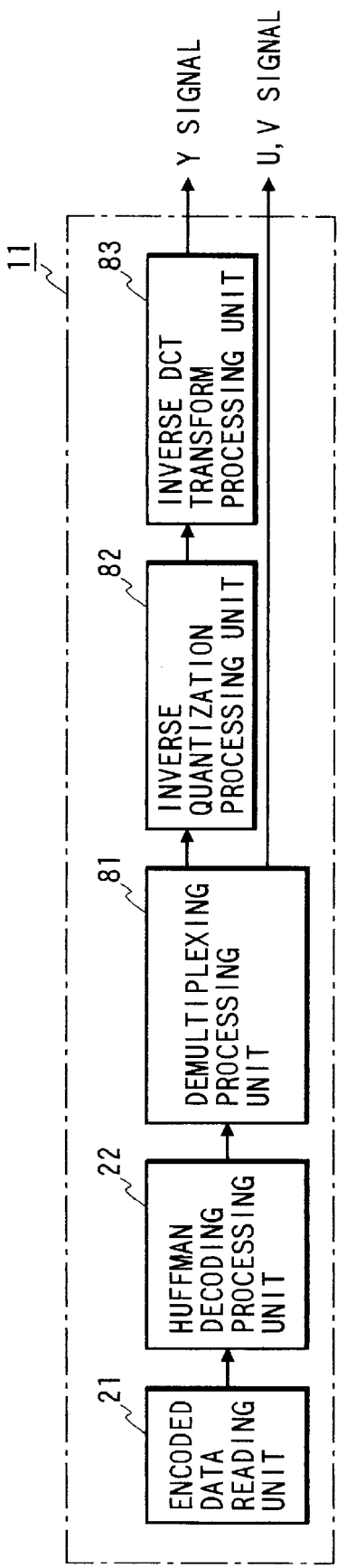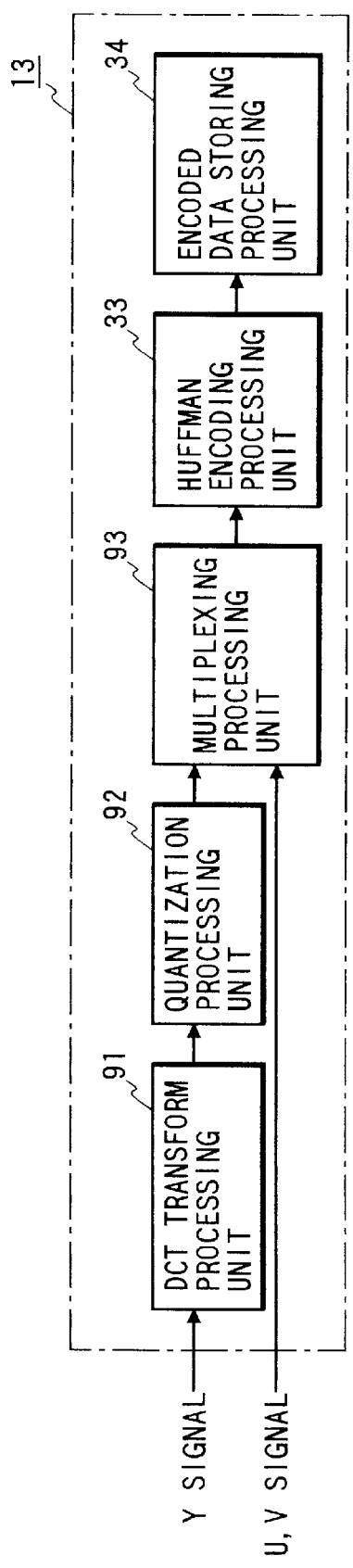

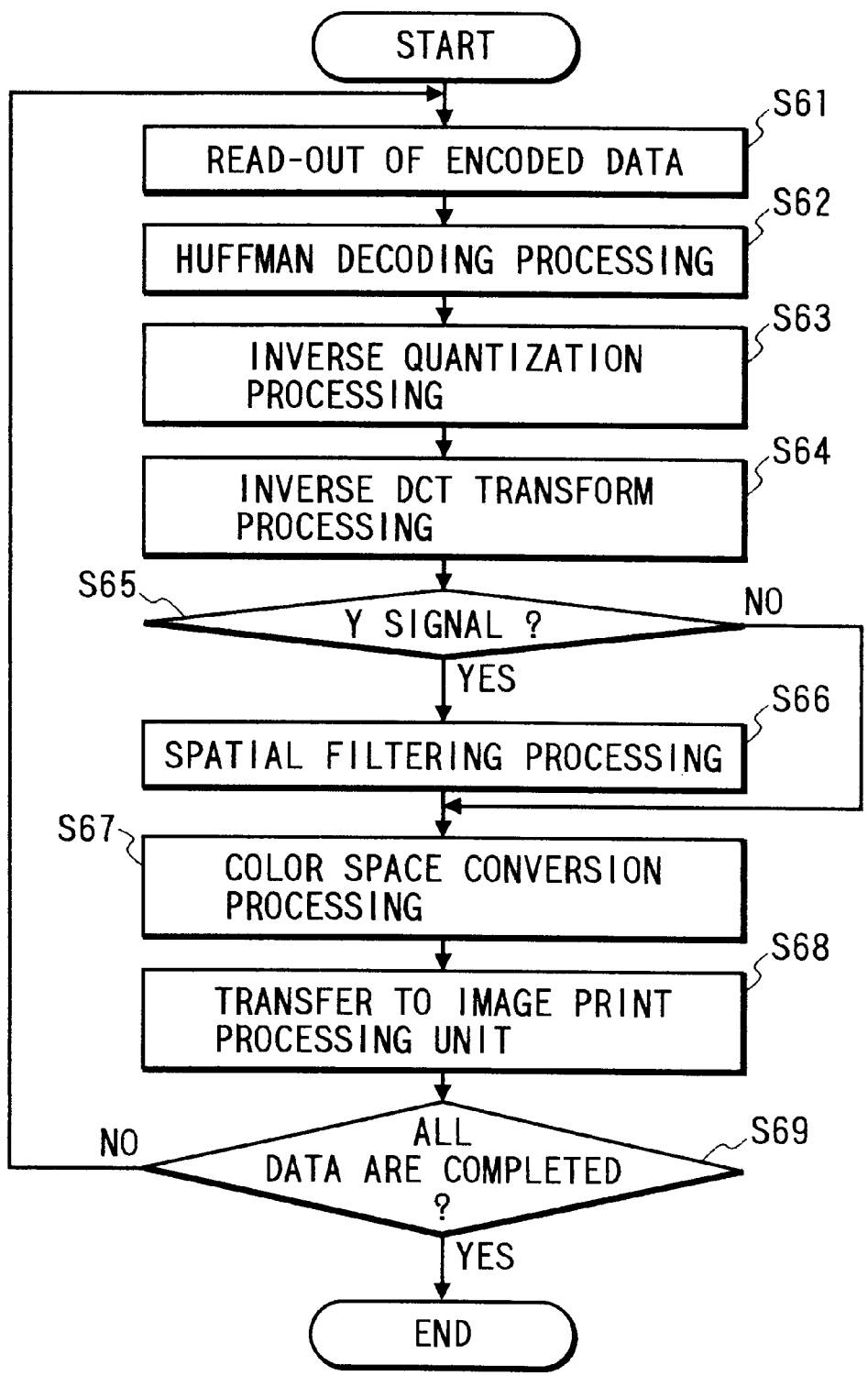

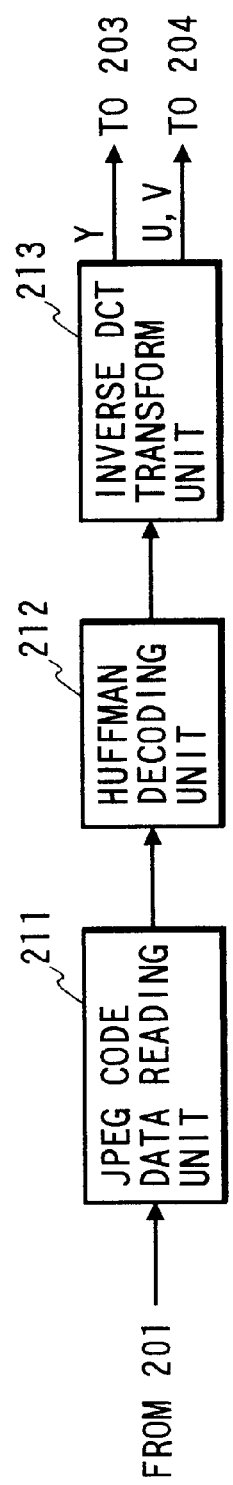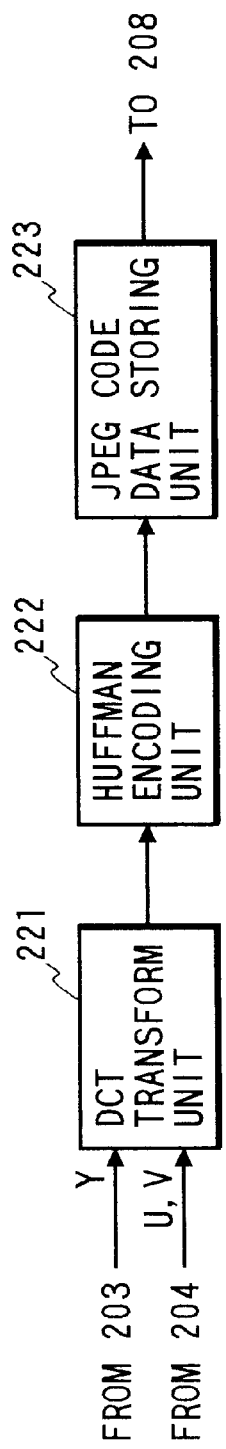

IMAGE PROCESSING APPARATUS AND METHOD

BACKGROUND OF THE INVENTION

1. Field of the Invention

The present invention relates to an image processing apparatus and, more particularly, to an image processing apparatus which performs pixel density conversion processing, spatial filtering processing, contrast processing, and the like for color image data.

2. Description of the Related Art

In conventional image processing apparatuses that perform image editing and image transmission, the image data to be processed are encoded upon storage or transmission, thus realizing reductions of the memory capacity and the transmission data volume.

In such conventional image processing apparatus, many encoding schemes of image data have been proposed and put into practical applications. Of such encoding schemes, the method of compressing color image data in the YUV (luminance and color difference) color space by the JPEG (Joint Photographic Experts Group) scheme is well known.

Image processing based on JPEG will be briefly described below with reference to FIG. 1.

FIG. 1 is a block diagram for attaining image compression processing based on JPEG.

Input image data is divided into (8×8) pixel blocks by a block forming processing unit 101.

The divided image data blocks are DCT (Discrete Cosine Transform)-transformed by a DCT transform processing unit 102. The DCT-transformed image data blocks are quantized based on a predetermined quantization step in a quantization processing unit 103, and the quantized blocks are Huffman-encoded by a Huffman encoding processing unit 104.

With the above-mentioned processing, the image data can be compressed to about 1/10 without making its image quality deterioration conspicuous.

The encoded image data may often be subjected to spatial filtering processing or contrast processing for image display or the like, or pixel density conversion processing for converting the data into a desired resolution or size.

Conventionally, the spatial filtering processing, contrast processing, and pixel density conversion processing are performed for R, G, and B signals as primary color signals.

Therefore, when the filtering processing or pixel density conversion processing is performed by the conventional method for the image data compression-encoded in the YUV color space by JPEG, or when compression encoding in the YUV color space like JPEG is performed for image data subjected to the filtering processing or pixel density conversion processing by the conventional method, a color space conversion processing unit for converting image signals of the primary color system (R, G, and B signals) into image signals of the color difference system, or vice versa, and an image processing unit for filtering processing are required for each color signal, resulting in complex processing.

Furthermore, in order to attain high-quality resolution conversion, a further complex arrangement is required.

Therefore, a long processing time is required when such processing is realized by software, or the circuit scale increases when it is realized by hardware, resulting in high cost.

SUMMARY OF THE INVENTION

It is an object of the present invention to provide, in consideration of the above-mentioned situation, an image processing apparatus and method which can realize simple image processing for already encoded color image data within a short period of time.

In order to achieve the above object, according to one preferred aspect of the present invention, an image processing apparatus and method are characterized in that color image data compression-encoded in the color difference system color space is input, the input color image data is decoded, luminance component data of the decoded color image data is subjected to correction processing, and the processed luminance component data and color difference component data of the decoded color image data are encoded.

According to one preferred aspect of the present invention, an image processing apparatus and method are characterized in that color image data compression-encoded in the color difference system color space is input, the input color image data is decoded, luminance component data of the decoded color image data is subjected to correction processing, and color space conversion is performed on the basis of the processed luminance component data and color difference component data of the decoded color image data.

It is another object of the present invention to provide an image processing apparatus and method, which can realize image processing and compression encoding of input color image data by simple processing within a short period of time.

In order to achieve the above object, according to one preferred aspect of the present invention, an image processing apparatus and method are characterized in that color image data is input, the input color image data is converted into data in the color difference system color space, luminance component data of the converted color image data is subjected to correction processing, and the processed luminance component data and color difference component data of the converted color image data are encoded.

It is still another object of the present invention to provide an image processing apparatus and method, which can realize high-speed pixel density conversion free from any deterioration of the image quality by changing the degree of image quality after conversion in units of components upon executing the pixel density conversion for color image data.

In order to achieve the above object, according to one preferred aspect of the present invention, an image processing apparatus and method are characterized in that color image data is input, first component data of the color image data is subjected to first pixel density conversion processing, second component data of the color image data is subjected to second pixel density conversion processing, and the first pixel density conversion processing can attain pixel density conversion with higher quality than that of the second pixel density conversion processing.

Other objects, features and advantages of the invention will become apparent from the following detailed description taken in conjunction with the accompanying drawings.

BRIEF DESCRIPTION OF THE DRAWINGS

FIG. 1 is a block diagram for realizing image compression processing based on JPEG;

FIG. 2 is a block diagram showing the basic arrangement of an image processing apparatus according to the first embodiment of the present invention;

FIG. 7 shows spatial filter coefficients;

FIG. 8 shows the reference pixel sequence in spatial filtering processing;

FIG. 9 is a block diagram showing in detail the arrangement of a luminance and color difference signals extraction unit 11 according to the second embodiment of the present invention;

FIG. 10 is a block diagram showing in detail the arrangement of a luminance and color difference signals storage unit 13 of the second embodiment;

FIG. 17 is a flow chart showing the operation of the image processing executed by a DSP 42 in the fifth embodiment;

FIG. 19 is a block diagram showing in detail the arrangement of a decoding processing unit 202;

FIG. 20 is a block diagram showing in detail the arrangement of an encoding unit 207;

DETAILED DESCRIPTION OF THE PREFERRED EMBODIMENTS

FIG. 2 is a block diagram showing the basic arrangement of the first embodiment according to the present invention. Assume that the image data to be processed in the first embodiment is encoded by JPEG, and is stored in a storage device such as a semiconductor memory, a hard disk, or the like.

Referring to FIG. 2, a luminance signal color difference signals extraction unit 11 reads out and decodes encoded data stored in the storage device to obtain a luminance (Y) signal and color difference (U, V) signals.

Subsequently, an image processing unit 12 performs filtering processing of the Y signal alone obtained by the luminance and color difference signals extraction unit 11. The Y signal obtained by the image processing unit 12, and the U and V signals extracted by the luminance and color difference signals extraction unit 11 are stored in the storage device by a luminance and color difference signals storage unit 13.

Figure 3:
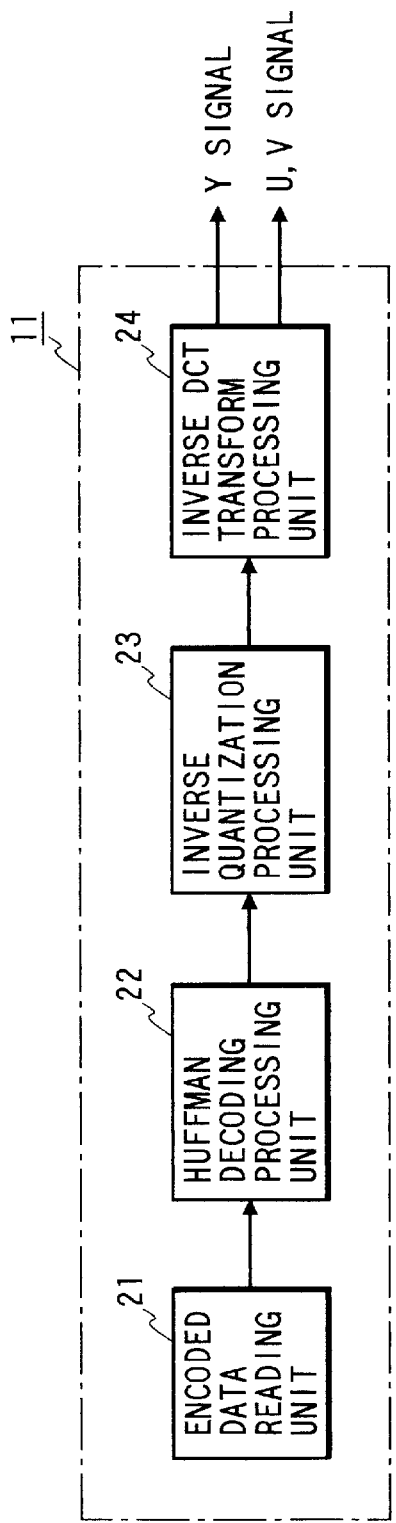
FIG. 3 is a block diagram showing in detail the arrangement of a luminance and color difference signals extraction unit 11 of the first embodiment.

FIG. 3 is a block diagram showing in detail the luminance and color difference signals extraction unit 11 of the first embodiment.

Referring to FIG. 3, an encoded data reading unit 21 reads out image data which is compression-encoded in the YUV color space, and is stored in, e.g., a hard disk, and a Huffman decoding processing unit 22 Huffman-decodes the image data read out by the encoded data reading unit 21. The decoded image data is inversely quantized by an inverse quantization processing unit 23 to be converted into DCT coefficient data. The inversely quantized image data is subjected to inverse DCT processing by an inverse DCT transform processing unit 24 to be demultiplexed into a Y signal and U and V signals.

Figure 4:
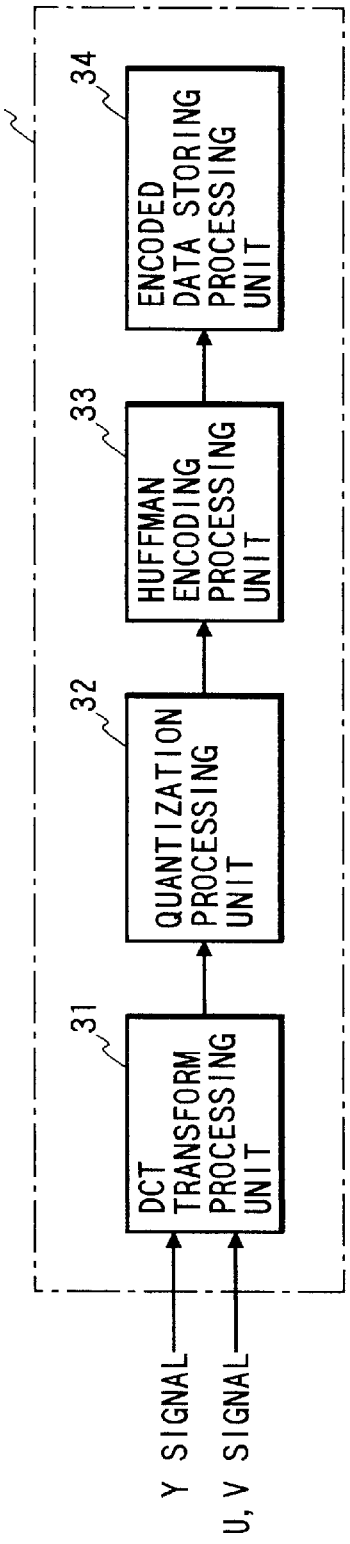
FIG. 4 is a block diagram showing in detail the arrangement of a luminance and color difference signals storage unit 13 of the first embodiment.

FIG. 4 is a block diagram showing in detail the luminance and color difference signals storage unit 13 of the first embodiment.

Referring to FIG. 4, a Y signal and U and V signals as a luminance signal and color difference signals are DCT-transformed by a DCT transform processing unit 31, and the transformed signals are quantized by a quantization processing unit 32. The quantized image data is Huffman-encoded by a Huffman encoding processing unit 33. The Huffman-encoded image data is stored in a storage device such as a hard disk or the like by an encoded data storing processing unit 34.

Figure 5:
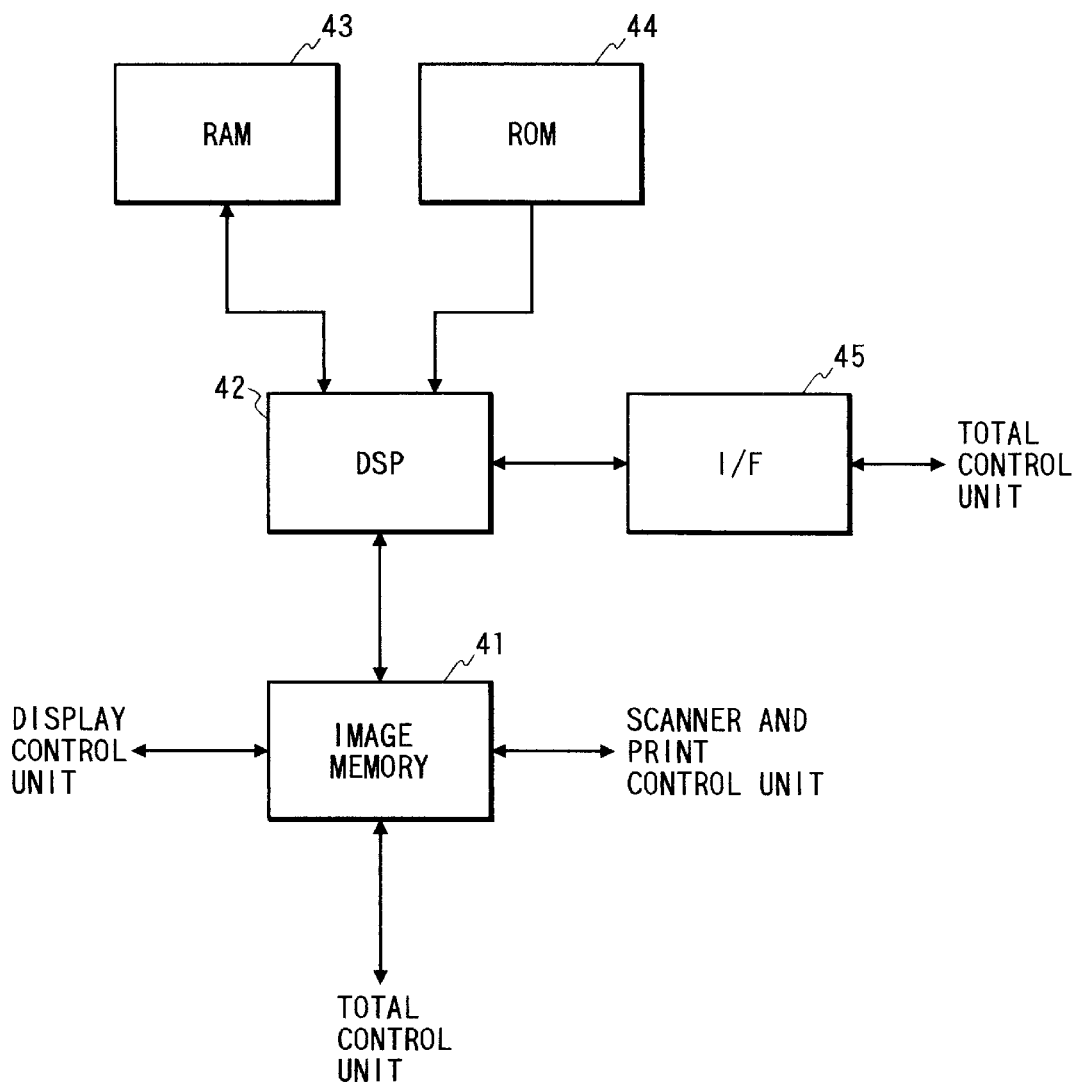
FIG. 5 is a block diagram showing the arrangement when the image processing of the present invention is to be realized by software using a digital signal processor (DSP)

FIG. 5 is a block diagram showing the arrangement when the image processing according to the present invention is to be realized using a digital signal processor (DSP).

Referring to FIG. 5, an image memory 41 has a plurality of ports, and is used as an image data buffer. The image memory 41 can be accessed by a display control unit, a scanner and print control unit, a microprocessor (MPU) of a total control unit (none of them are shown), a DSP 42 (to be described below), and the like.

The DSP 42 executes image processing and the like associated with the present invention in accordance with a program stored in a ROM (Read Only Memory) 44, and the like.

Note that a RAM (Random Access Memory) 43 is used as the work memory of the DSP 42.

An interface unit (i/f) 45 exchanges commands that indicate the operations of the DSP and the like between the DSP 42 and the MPU that controls the total operations.

Note that the encoded data to be processed by the image processing is transferred in advance from a storage device such as a hard disk or the like (not shown) to the image memory 41 under the control of the total control unit.

The operation flow for executing the image processing of the first embodiment with the arrangement shown in FIG. 5 will be described below with reference to FIG. 6.

In step S1, encoded data necessary for the image processing are sequentially read out from the storage device, and the flow advances to step S2.

In step S2, the readout encoded data are Huffman-decoded. The decoded image data are inversely quantized in step S3, and the inversely quantized data are inversely DCT-transformed into image data in the YUV color space in step S4.

In step S5, it is checked if the signal of interest is a Y signal. If YES in step S5, the flow advances to step S6; otherwise, the flow jumps to step S7.

In step S6, spatial filtering processing is performed for the Y signal.

The spatial filtering processing of this embodiment will be described below.

FIG. 7 shows spatial filter processing coefficients of this embodiment. FIG. 7 shows filter coefficients used when a Laplacian filter for the purpose of edge emphasis is to be implemented.

FIG. 8 shows an example of reference pixels. When filtering processing with the coefficients shown in FIG. 7 is performed for pixel data $P_{22}$ in FIG. 8, the pixel value after the processing is obtained by the following equation:

$$P_{22}=P_{22}+(4 \times P_{22}-P_{12}-P_{21}-P_{23}-P_{32})/4$$

Figure 6:
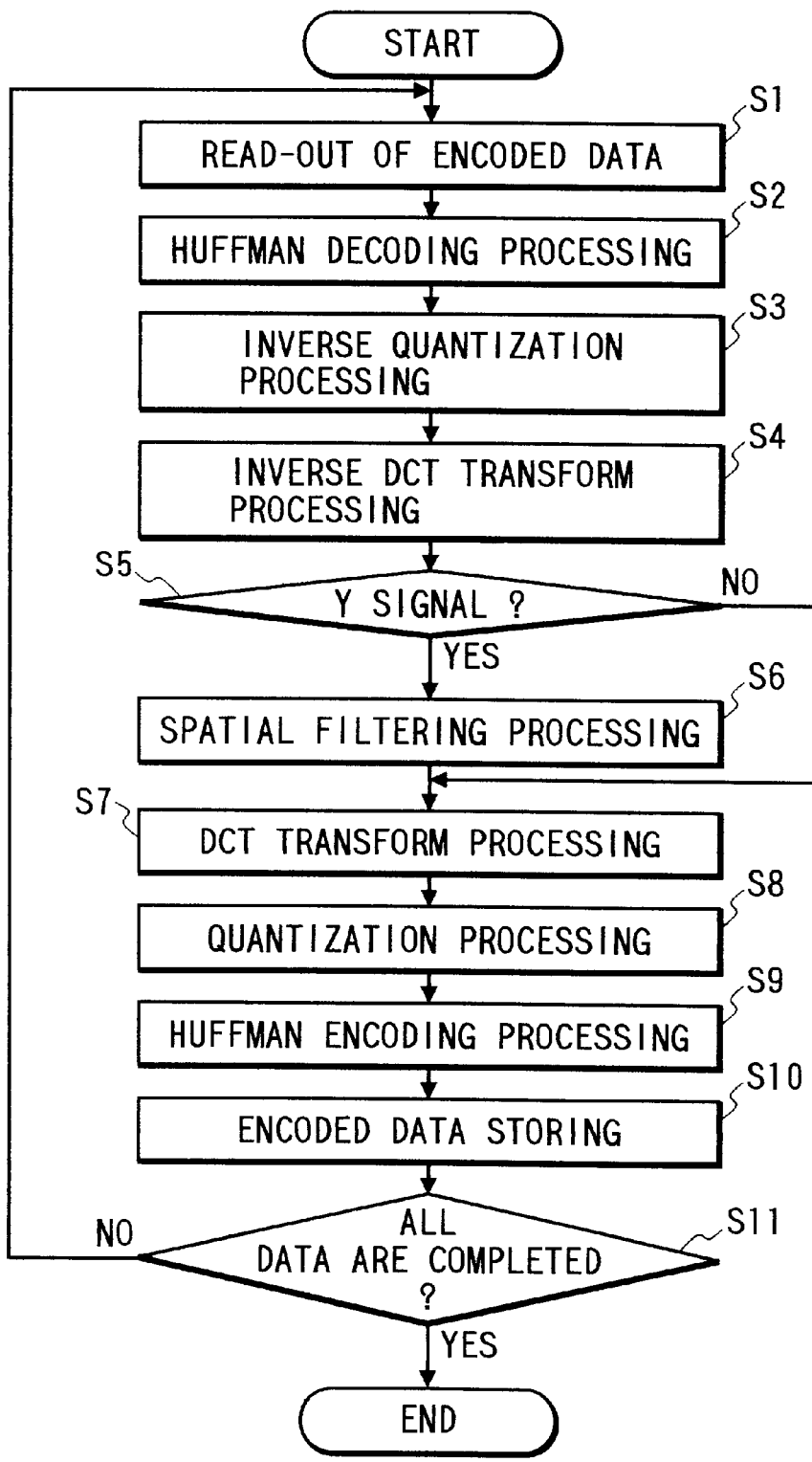
FIG. 6 is a flow chart showing the operation of the image processing executed by a DSP 42 in the first embodiment.

Returning to the description of the flow in FIG. 6, the Y signal subjected to the filtering processing in step S6 is DCT-transformed in step S7.

On the other hand, if U and V signals are determined in step S5, these signals are directly DCT-transformed in step S7.

In step S8, quantization processing is executed. Thereafter, image data is Huffman-encoded in step S9.

In step S10, the encoded image data is stored in a storage device such as a hard disk. In step S11, it is checked if the above-mentioned processing has been performed for all data. If YES in step S11, the flow ends; otherwise, the flow returns to step S1.

With the above-mentioned processing, the edge emphasis processing can be performed for the compression-encoded image data.

As described above, according to this embodiment, spatial filtering processing with sufficiently high quality in practice can be performed for image data which is compression-encoded in the YUV color space by, e.g., JPEG by a simple method within a short period of time.

The basic arrangement of an image processing apparatus of the second embodiment is the same as that shown in FIG. 2 as in the first embodiment.

In the second embodiment, the arrangements of the luminance and color difference signals extraction unit 11 and the luminance and color difference signals storage unit 13 in FIG. 2 are different from those in the first embodiment, and the image processing unit 12 is the same as that in the first embodiment.

In the second embodiment, in order to attain simpler processing than in the first embodiment, the decoding processing of the color difference signals is ended upon the Huffman decoding processing, and the need for the decoding processing of the color difference signals is obviated.

FIG. 9 is a block diagram showing in detail the arrangement of the luminance and color difference signals extraction unit 11 in the second embodiment. Note that the same reference numerals in FIG. 9 denote the same parts as in FIG. 3.

Referring to FIG. 9, an encoded data reading unit 21 reads out image data which is compression-encoded in the YUV color space and stored in, e.g., a hard disk or the like, and a Huffman decoding processing unit 22 Huffman-decodes the image data read out by the encoded data reading unit 21.

The decoded image data is demultiplexed into a luminance (Y) signal and color difference (U, V) signals by a demultiplexing processing unit 81 in accordance with a prescribed format.

The luminance signal demultiplexed by the demultiplexing processing unit 81 is inversely quantized by an inverse quantization processing unit 82, and is also inversely DCT-transformed by an inverse DCT transform processing unit 83 to obtain a completely decoded luminance signal. The luminance signal is output to the image processing unit 12.

The color difference signals demultiplexed by the demultiplexing processing unit 81 are directly output to the luminance and color difference signals storage unit 13.

FIG. 10 is a block diagram showing in detail the arrangement of the luminance and color difference signals storage unit 13 of the second embodiment. Note that the same reference numerals in FIG. 10 denote the same parts as in FIG. 4.

Referring to FIG. 10, the luminance signal subjected to the image processing in the image processing unit 12 is DCT-transformed by a DCT transform processing unit 91, and is quantized by a quantization processing unit 92. The quantized luminance signal is supplied to a multiplexing processing unit 93.

The multiplexing processing unit 93 multiplexes the luminance signal quantized by the quantization processing unit 92, and the color difference signals demultiplexed by the demultiplexing processing unit 81 in the luminance and color difference signals extraction unit 11 in accordance with a predetermined format.

The image data processed by the multiplexing processing unit 93 is Huffman-encoded by a Huffman encoding processing unit 33. The Huffman-encoded image data is stored in a storage device such as a hard disk or the like by an encoded data storing processing unit 34.

The processing upon executing the image processing of the second embodiment by software using the arrangement shown in FIG. 5 in the second embodiment as well will be explained below.

Figure 11:
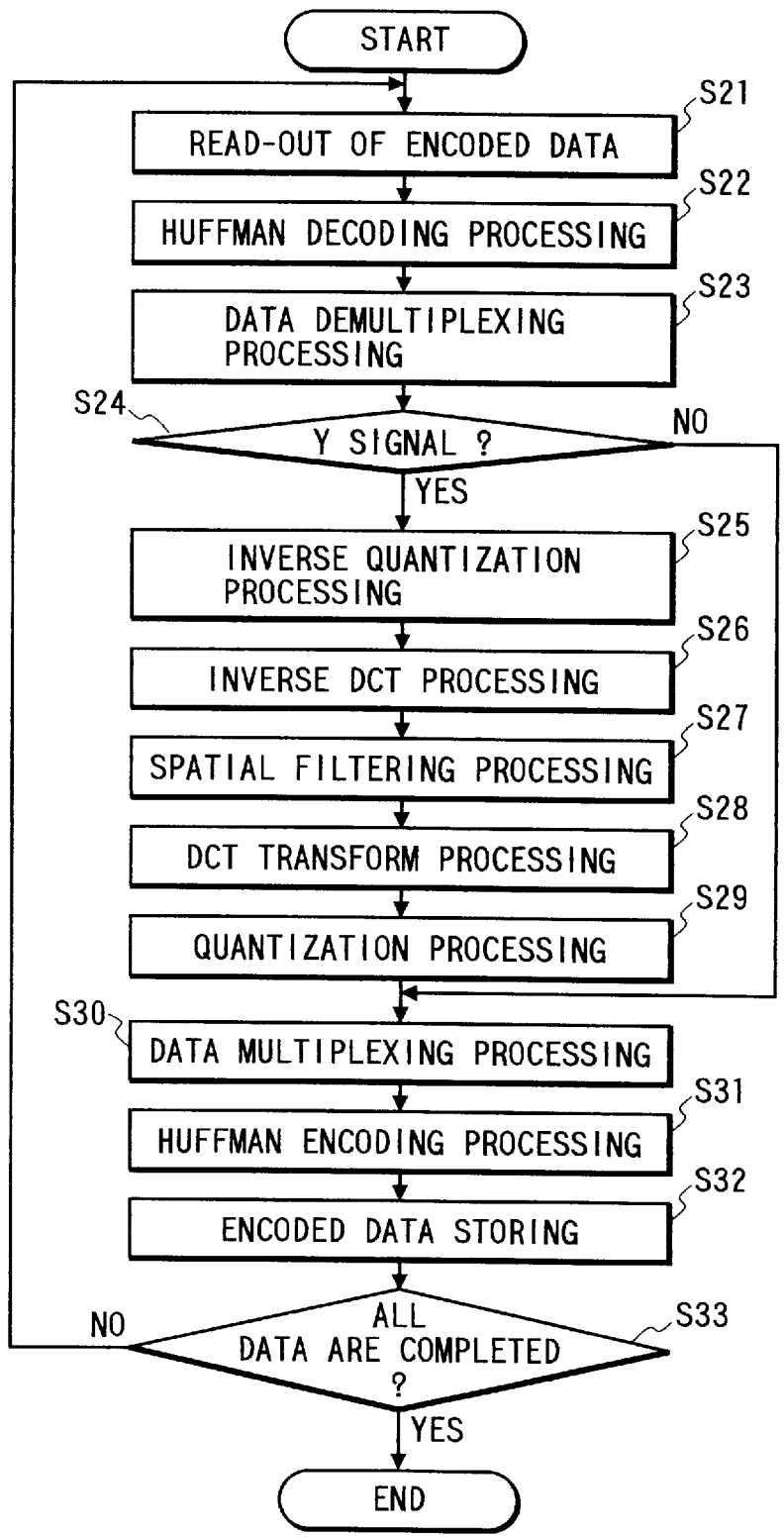
FIG. 11 is a flow chart showing the operation of the image processing executed by a DSP 42 in the second embodiment.

FIG. 11 is a flow chart showing the operation of the image processing to be executed by a DSP 42 in the second embodiment.

In step S21, encoded data necessary for the image processing are sequentially read out from the storage device, and the flow advances to step S22.

In step S22, the readout encoded data are Huffman-decoded. In step S23, the Huffman-decoded image data are demultiplexed into a Y signal and U and V signals in accordance with the designated format.

In step S24, it is checked if the signal of interest is a Y signal. If YES in step S24, the flow advances to step S25; otherwise, the flow jumps to step S30.

The Y signal is inversely quantized in step S25, and the quantized signal is inversely DCT-transformed in step S26. In step S27, spatial filtering processing is executed for the Y signal.

Note that the same spatial filtering processing as in the first embodiment is performed, and a detailed description thereof will be omitted.

The Y signal subjected to the filtering processing in step S27 is DCT-transformed in step S28, and is then quantized in step S29.

In step S30, the Y signal quantized in step S28 and the U and V signals determined in step S24 are multiplexed in accordance with a predetermined format.

The image data multiplexed in step S30 is Huffman-coded in step S31.

In step S32, the encoded image data is stored in a storage device such as a hard disk or the like. It is then checked in step S33 if the above-mentioned processing has been performed for all data. If YES in step S33, the flow ends; otherwise, the flow returns to step S21.

With the above-mentioned processing, the edge emphasis processing can be performed for the compression-encoded image data.

As described above, according to this embodiment, spatial filtering processing with sufficiently high quality in practice can be performed for image data which is compression-encoded in the YUV color space by, e.g., JPEG by a simpler method within a shorter period of time than those in the first embodiment.

The basic arrangement of an image processing apparatus according to the third embodiment is the same as that shown in FIG. 1 as in the first embodiment.

In the third embodiment, the arrangement of only the luminance and color difference signals extraction unit 11 shown in FIG. 2 is different from that in the first embodiment, and other processing units are the same as those in the first embodiment.

In the luminance and color difference signals extraction unit 11 in the third embodiment, image signals in the RGB color space read by, e.g., a scanner are subjected to color space conversion to output image signals in the YUV color space.

Figure 12:
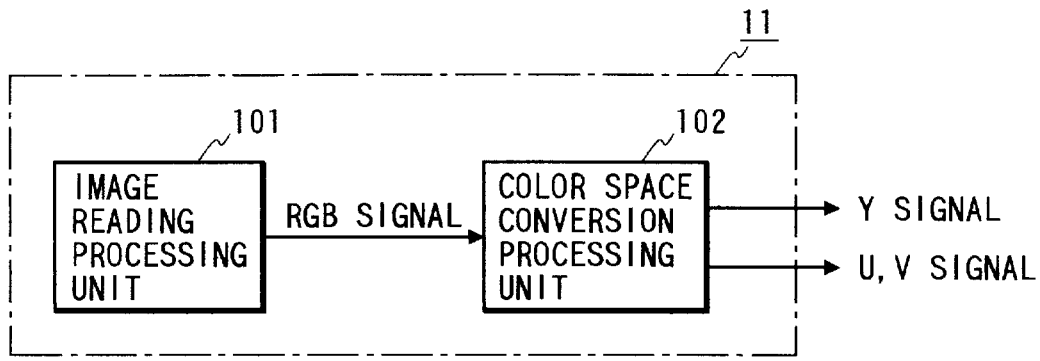
FIG. 12 is a block diagram showing in detail the arrangement of a luminance and color difference signals extraction unit 11 according to the third embodiment of the present invention.

FIG. 12 is a block diagram showing in detail the arrangement of the luminance and color difference signals extraction unit 11 in the third embodiment.

An image reading processing unit 101 obtains image signals in the RGB color space using, e.g., an optical scanner. A color space conversion processing unit 102 converts the R, G, and B image signals obtained by the image reading processing unit 101 into image signals in the YUV color space, i.e, a luminance signal and color difference signals.

Since the image processing unit 12 and the luminance and color difference signals storage unit 13 are the same as those in the first embodiment, a detailed description thereof will be omitted.

The processing upon executing the image processing of the third embodiment by software using the arrangement shown in FIG. 5 in the third embodiment as well will be explained below.

Figure 13:
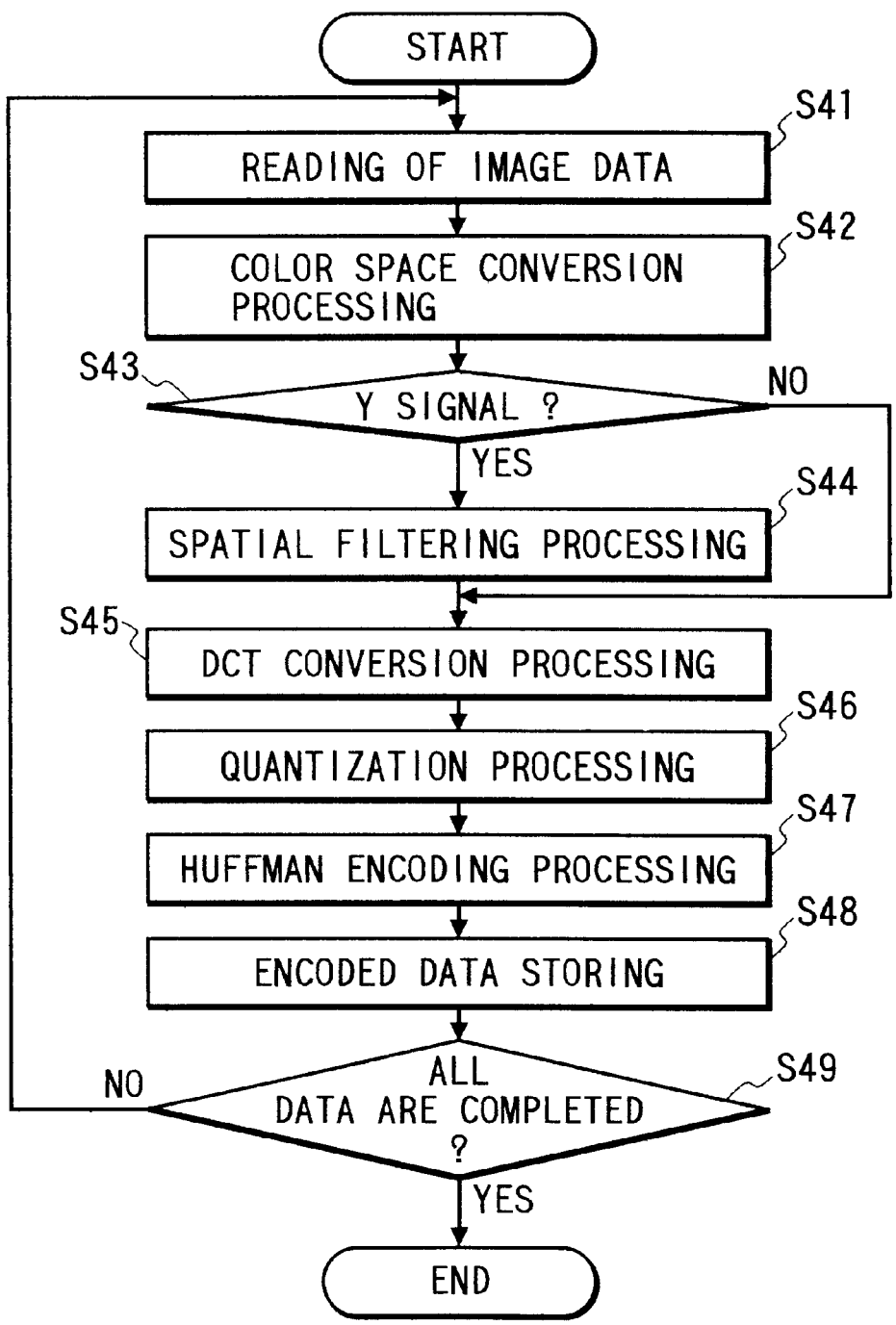
FIG. 13 is a flow chart showing the operation of the image processing executed by a DSP 42 in the third embodiment.

FIG. 13 is a flow chart showing the operation of the image processing to be executed by a DSP 42 in the third embodiment.

In step S41, R, G, and B image signals obtained by an image reading processing unit (not shown; e.g., a scanner) are read. In step S42, the read R, G, and B signals are subjected to color space conversion processing to generate Y, U, and V image signals.

In the color space conversion processing, the R, G, and B signals are converted into Y, U, and V signals by the following matrix calculations:

Y=0.2988×R+0.5869×G+0.1143×B

U=0.7130×(R−Y)

V=0.5640×(B−Y)

In step S43, it is checked if the signal of interest is a Y signal. If YES in step S43, the flow advance to step S44; otherwise, the flow jumps to step S45.

In step S44, spatial filtering processing is performed for the Y signal.

Note that the same spatial filtering processing as in the first embodiment is performed, and a detailed description thereof will be omitted.

The Y signal subjected to the filtering processing in step S44 is DCT-transformed in step S45.

On the other hand, if the U and V signals are determined in step S43, the flow advances to step S45, and the U and V signals are directly DCT-transformed.

Subsequently, quantization processing is performed in step S46, and Huffman-encoding is performed in step S47.

In step S48, the encoded image data is stored in a storage device such as a hard disk or the like. It is then checked in step S49 if the above-mentioned processing has been performed for all data. If YES in step S49, the flow ends; otherwise, the flow returns to step S41.

As described above, according to the third embodiment, when image data read by, e.g., an image reading device such as a scanner is compressed by JPEG or the like and the compressed data is stored, spatial filtering processing with sufficiently high quality in practice can be performed by a simple method within a short period of time.

In the fourth embodiment, the arrangement of only the luminance and color difference signals storage unit 13 is different from that in the first embodiment, and other processing units are the same as those in the first embodiment.

In the luminance and color difference signals storage unit 13 of the fourth embodiment, the luminance signal obtained by the image processing unit 12, and the color difference signals obtained by the luminance and color difference signals extraction unit 11 are converted into image signals in the RGB color space, and the converted signals are displayed on an image display device.

Figure 14:
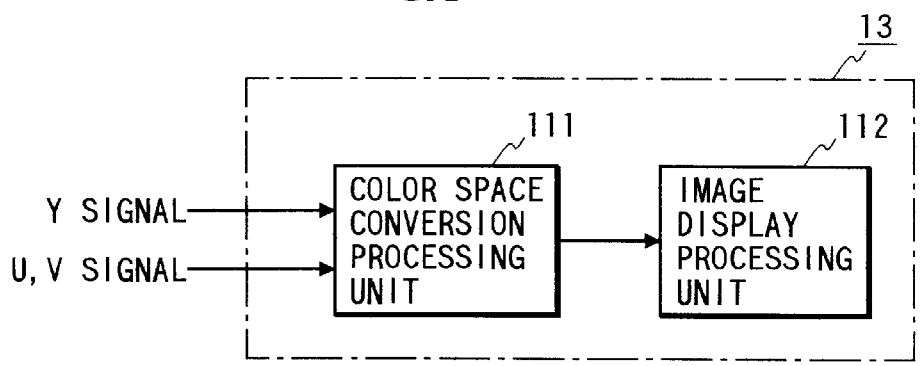
FIG. 14 is a block diagram showing in detail the arrangement of a luminance and color difference signals extraction unit 11 according to the fourth embodiment of the present invention.

FIG. 14 is a block diagram showing the arrangement of the luminance and color difference signals storage unit 11 of the fourth embodiment.

A color space conversion processing unit 111 converts Y, U, and V signals into R, G, and B signals. An image display processing unit 112 displays the color-converted R, G, and B signals on an image display device such as a CRT or the like.

Since the luminance and color difference signals extraction unit 11 and the image processing unit 12 are the same as those in the first embodiment, a detailed description thereof will be omitted.

The processing upon executing the image processing of the fourth embodiment by software using the arrangement shown in FIG. 5 in the fourth embodiment as well will be explained below.

Figure 15:
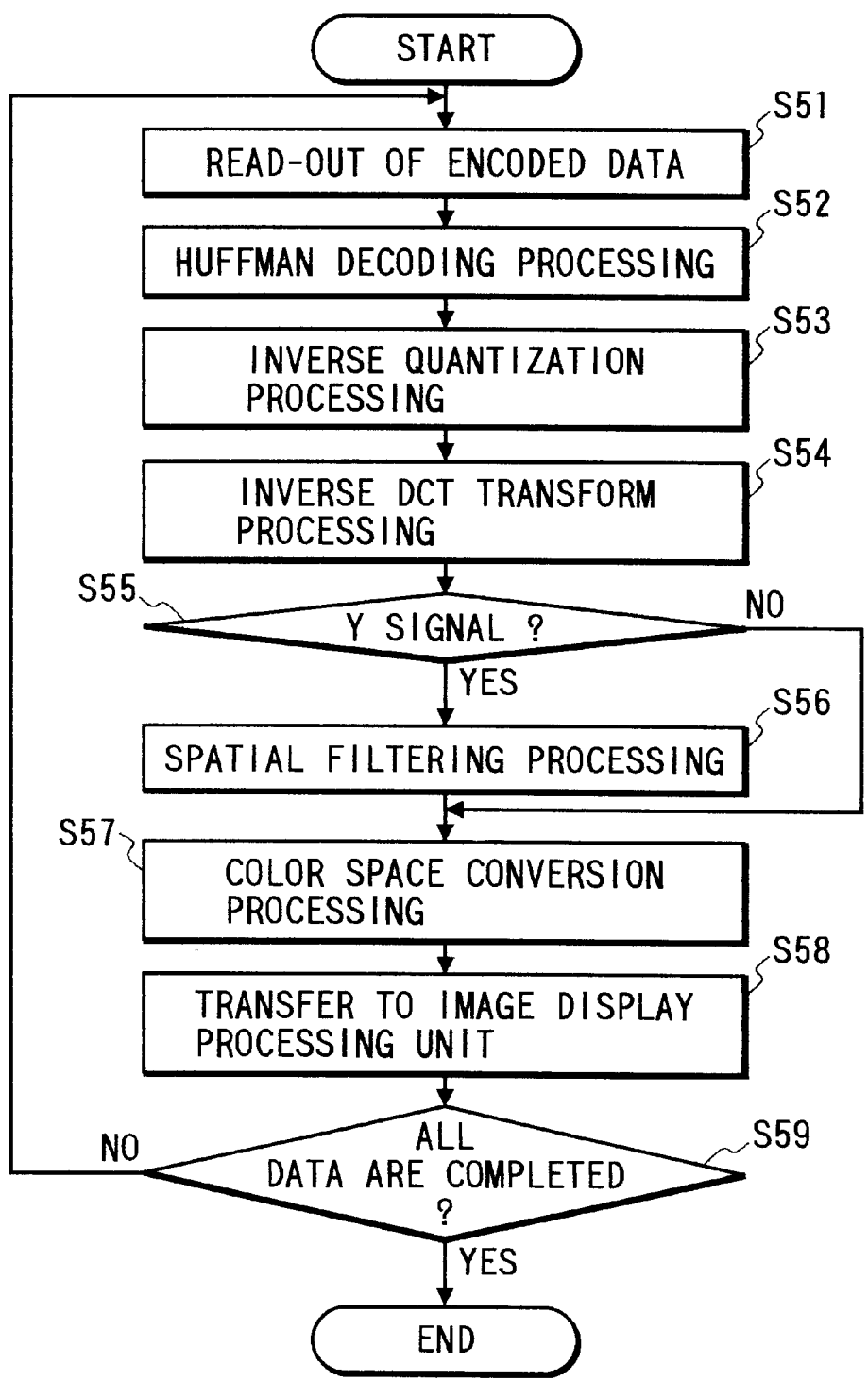
FIG. 15 is a flow chart showing the operation of the image processing executed by a DSP 42 in the fourth embodiment.

FIG. 15 is a flow chart showing the operation of the image processing to be executed by a DSP 42 in the fourth embodiment.

In step S51, encoded image data required for image processing are sequentially read out from a storage device. The readout encoded data are Huffman-decoded in step S52.

The Huffman-decoded image data are inversely quantized in step S53.

The inversely quantized image data are inversely DCT-transformed in step S54 to extract image data in the YUV color space.

It is checked in step S55 if the signal of interest is a Y signal. If YES in step S55, the flow advances to step S56; otherwise, the flow jumps to step S57.

In step S56, spatial filtering processing is performed for the Y signal.

Note that the same spatial filtering processing as in the first embodiment is performed, and a detailed description thereof will be omitted.

The Y signal subjected to the filtering processing in step S56, and the U and V signals extracted by the inverse DCT transform processing are subjected to color space conversion processing in step S57. In this processing, the Y, U, and V signals are converted into R, G, and B signals. The color space conversion processing is realized by, e.g., matrix calculations obtained by inverse conversion of RGB signals→YUV signals described in the third embodiment.

The R, G, and B signals obtained by the color space conversion processing is transferred to the image display processing unit for controlling, e.g., a CRT in step S58.

It is then checked in step S59 if the above-mentioned processing has been performed for all data. If YES in step S59, the flow ends; otherwise, the flow returns to step S51.

As described above, according to this embodiment, when image data which is compressed and stored by, e.g., JPEG is to be displayed on the image display device, spatial filtering processing with sufficiently high quality in practice can be performed by a simple method within a short period of time.

In the fifth embodiment, the arrangement of only the luminance and color difference signals storage unit 13 is different from that in the first embodiment, and other processing units are the same as those in the first embodiment.

In the luminance and color difference signals storage unit 13 of this embodiment, the luminance signal obtained by the image processing unit 12 and the color difference signals obtained by the luminance and color difference signals extraction unit 11 are converted into image signals in the CMY color space, and the converted image signals are printed by an image print processing unit.

Figure 16:
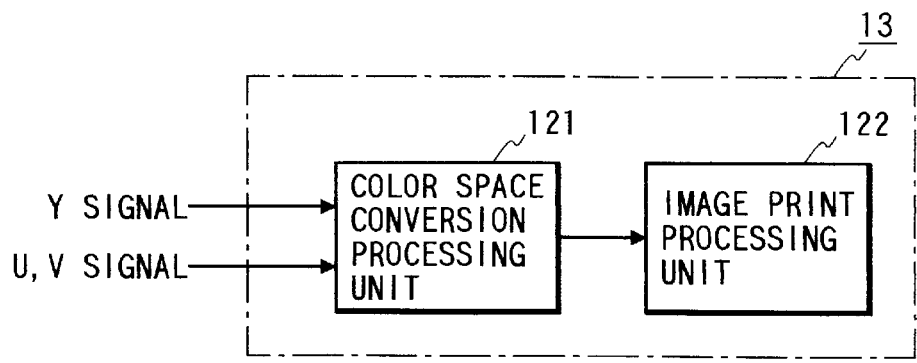
FIG. 16 is a block diagram showing in detail the arrangement of a luminance and color difference signals storage unit 13 according to the fifth embodiment of the present invention.

FIG. 16 is a block diagram showing in detail the arrangement of the luminance and color difference signals storage unit 13 of the fifth embodiment.

A color space conversion processing unit 121 converts Y, U, and V signals into C, M, and Y signals. An image print processing unit 122 prints image data in the CMY color space subjected to the color space conversion using a printer.

Since the luminance and color difference signals extraction unit 11 and the image processing unit 12 are the same as those in the first embodiment, a detailed description thereof will be omitted.

The processing upon executing the image processing of the fifth embodiment by software using the arrangement shown in FIG. 5 in the fifth embodiment as well will be explained below.

FIG. 17 is a flow chart showing the operation of the image processing to be executed by a DSP 42 in the fifth embodiment.

In step S61, encoded image data required for image processing are sequentially read out from a storage device. The readout encoded image data are Huffman-decoded in step S62.

The Huffman-decoded image data are inversely quantized in step S63.

The inversely quantized image data are inversely DCT-transformed in step S64 to obtain image data in the YUV color space.

In step S65, it is checked if the signal of interest is a Y signal. If YES in step S65, the flow advances to step S66; otherwise, the flow jumps to step S67.

In step S66, spatial filtering processing is performed for the Y signal.

Note that the spatial filtering processing is the same as that in the first embodiment.

The Y signal subjected to the filtering processing in step S66, and U and V signals obtained by the inverse DCT transform processing are subjected to color space conversion processing in step S67. In this processing, the Y, U, and V signals are converted into C, M, and Y signals. The color space conversion processing in this case is realized by looking up, e.g., a look-up table which is formed in advance in correspondence with the image display characteristics of a printer.

The C, M, and Y signals obtained by the color space conversion are transferred to the image print processing unit for controlling, e.g., a printer in step S68.

In step S69, it is checked if the above-mentioned processing has been performed for all data. If YES in step S69, the flow ends; otherwise, the flow returns to step S61.

As described above, when image data, which is compressed and stored by, e.g., JPEG, is to be subjected to print processing, spatial filtering processing with sufficiently high quality in practice can be performed by a simple method.

Figure 18:
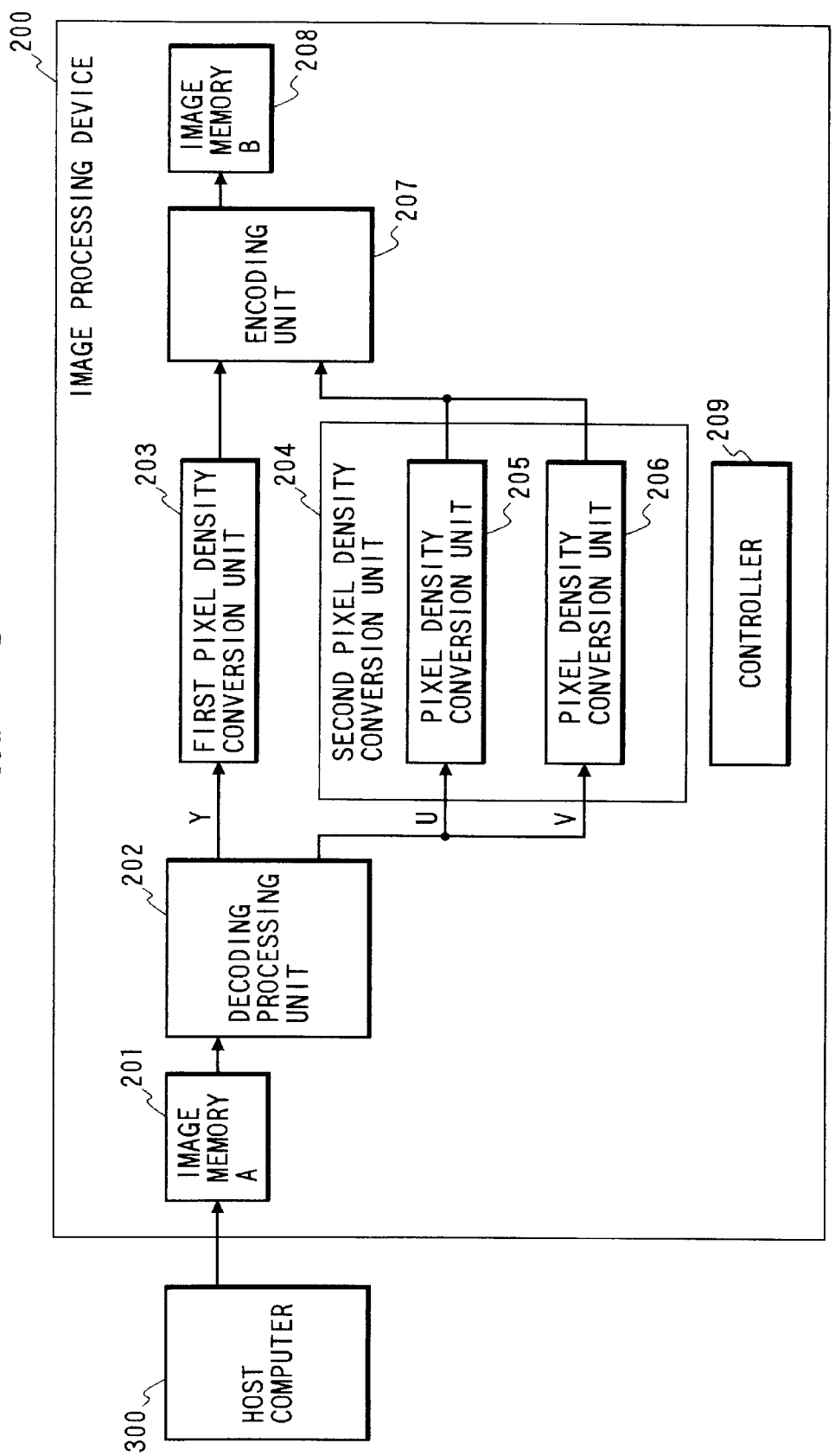
FIG. 18 is a block diagram showing the arrangement of an image processing apparatus according to the sixth embodiment of the present invention.

FIG. 18 is a block diagram showing the basic system arrangement using an image processing apparatus of this embodiment, and illustrates the state wherein an image processing device 200 is connected to a host computer 300.

Image data serving as an original image in the pixel density conversion processing of this embodiment is JPEG-encoded in the host computer 300, and is transferred to and held in an image memory A 201 in the image processing device 200 in the form of code data. The image memory A 201 comprises, e.g., a semiconductor memory, but may comprise a storage device such as a hard disk or the like. Alternatively, the code data may be stored in an external storage device such as a floppy disk, which may be loaded into the image processing device 200 to implement the image memory A 201.

A decoding processing unit 202 reads out and expands image data in the YUV color space held as the code data in the image memory A 201 so as to obtain Y, U, and V image data. FIG. 19 shows in detail the arrangement of the decoding processing unit 202, and its operation will be described below. Referring to FIG. 19, the code data held in the image memory A 201 are sequentially read out by a JPEG code data reading unit 217. The readout code data are Huffman-decoded by a Huffman decoding unit 212 to obtain DCT coefficients. The DCT coefficients are inversely DCT-transformed by an inverse DCT transform unit 213 to reconstruct and output image data in the YUV color space.

Referring back to FIG. 18, a first pixel density conversion unit 203 performs pixel density conversion of a luminance signal (Y signal in this case) obtained by the decoding processing unit 202 by processing suffering less image quality deterioration such as projection. On the other hand, a second pixel density conversion unit 204 performs pixel density conversion of color difference signals (U and V signals) obtained by the decoding processing unit 11 by simple processing such as simple thinning-out. Note that the second pixel density conversion unit 204 includes a pixel density conversion unit 205 for the U signal, and a pixel density conversion unit 206 for the V signal.

The luminance and color difference signals subjected to the pixel density conversion in the first and second pixel density conversion units 203 and 204 are JPEG-encoded again by an encoding unit 207, and the encoded data are stored in an image memory B 208. FIG. 20 shows in detail the arrangement of the encoding unit 207, and its operation will be described below. Referring to FIG. 20, the Y signal and the U and V signals input to the encoding unit 207 are DCT-transformed by a DCT transform unit 221 to obtain DCT coefficients. The obtained DCT coefficients are Huffman-encoded by a Huffman encoding unit 222 to obtain JPEG code data. The JPEG code data are sequentially stored in the image memory 208 by a JPEG code data storing unit 223.

The above-mentioned image display processing in this embodiment is systematically controlled by a controller 209.

Figure 21:
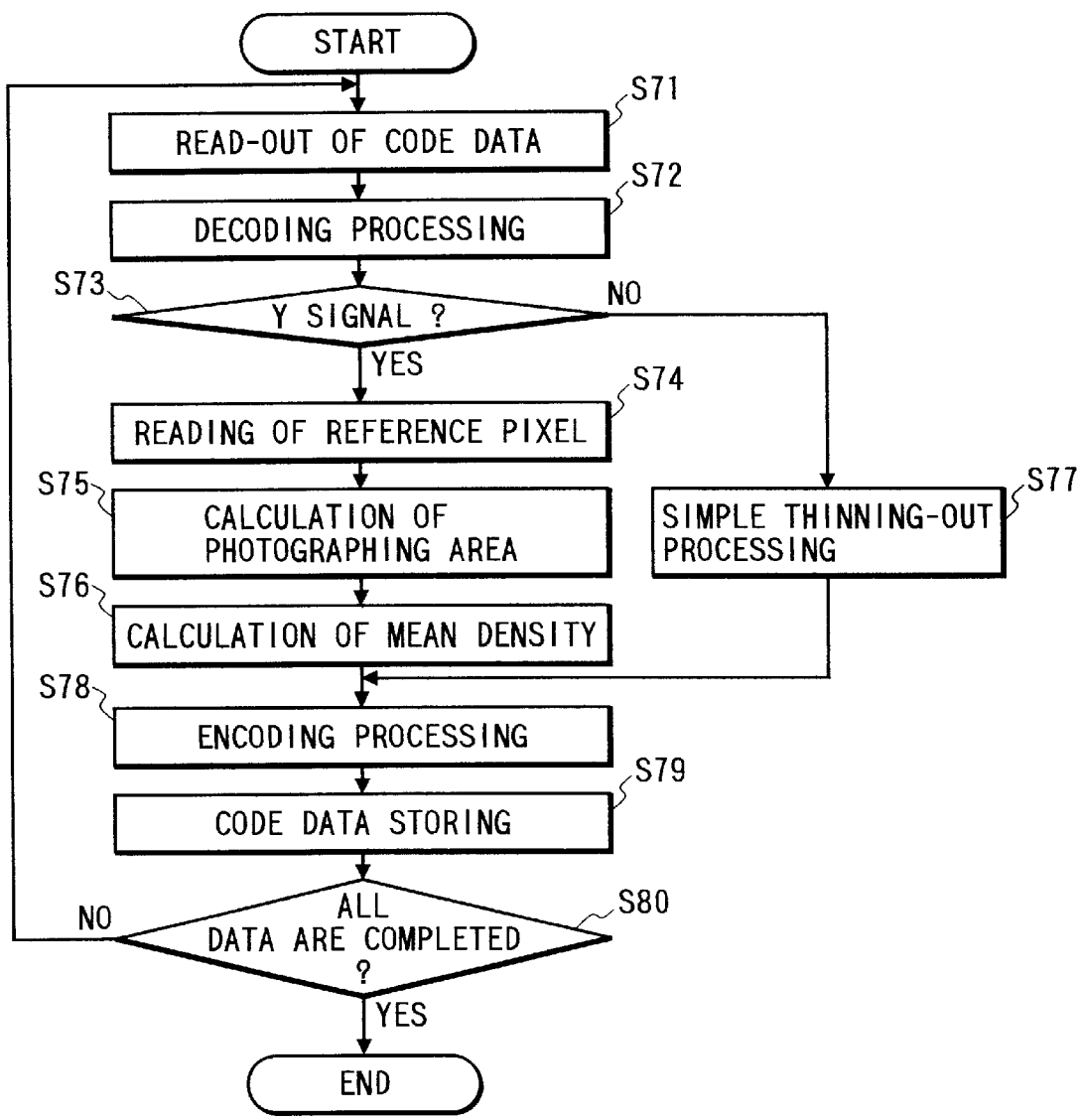
FIG. 21 is a flow chart showing pixel density conversion processing in the sixth embodiment.

FIG. 21 is a flow chart showing the pixel density conversion processing in the image processing device 200.

When an image pixel density conversion instruction is issued in this embodiment, the controller 209 reads out Y, U, and V code data from the image memory A 201 in step S71. The readout code data are subjected to Huffman decoding and inverse DCT transform in the decoding processing unit 202 in step S72, thereby reproducing image data in the YUV space from the JPEG code data.

It is checked in step S73 if the decoded data of interest is a Y signal. If YES in step S73, the flow advances to step S74, and the Y signal is subjected to the pixel density conversion processing based on projection in the first pixel density conversion unit 203.

The basic principle of pixel density conversion method based on the projection method in this embodiment will be explained below with reference to FIG. 22. For the sake of simplicity, assume that the conversion magnification in each of the main scanning direction and subscanning direction is ⅔, and the number of pixels of the original image is 3×3.

A case will be examined below with reference to FIG. 22 wherein an original image 232 consisting of 3×3 pixels is converted into a conversion image 230 of 2×2 pixels. First, the conversion image 230 is projected onto the original image 232, thus obtaining a projected image 231. Note that pixels (original pixels) in the original image 232 are indicated by X marks, pixels (conversion pixels) in the conversion image 230 are indicated by ○, and each pixel has a square region (pixel plane).

Let P, Q, R, and S be original pixels having pixel planes that overlap that of a conversion pixel A as the pixel of interest in the projection image 231.

Also, let SP, SQ, SR, and SS be the areas of the pixel planes of the original pixels P, Q, R, and S within the pixel plane of the conversion pixel A projected onto the original image 232, and IP, IQ, IR, and IS be their pixel values. Then, the mean density IA of the pixel A of interest is given by:

$$IA=(SP \cdot IP+SQ \cdot IQ+SR \cdot IR+SS \cdot IS)/(SP+SQ+SR+SS) \qquad (1)$$

The mean density IA obtained in this manner is used as the pixel value of the conversion pixel A upon projection in this embodiment. Note that the original image 232 in this embodiment may be either a binary image or multi-valued image.

As is generally known, the pixel density conversion processing based on projection suffers less image quality deterioration among the conventionally proposed pixel density conversion schemes, as described in *Information Processing Society of Japan Transactions*, VOL. 26, No. 5. However, the pixel density conversion processing based on projection requires multiplications upon calculating the mean density IA as the conversion pixel value, as can be seen from equation (1) above, and complex arithmetic operations are needed. In this embodiment, the pixel density conversion based on projection, which is complex but can assure high-quality conversion, is performed for only a luminance component signal (Y signal) which has the largest influence on the visual sense characteristics of a human being.

Figure 22:
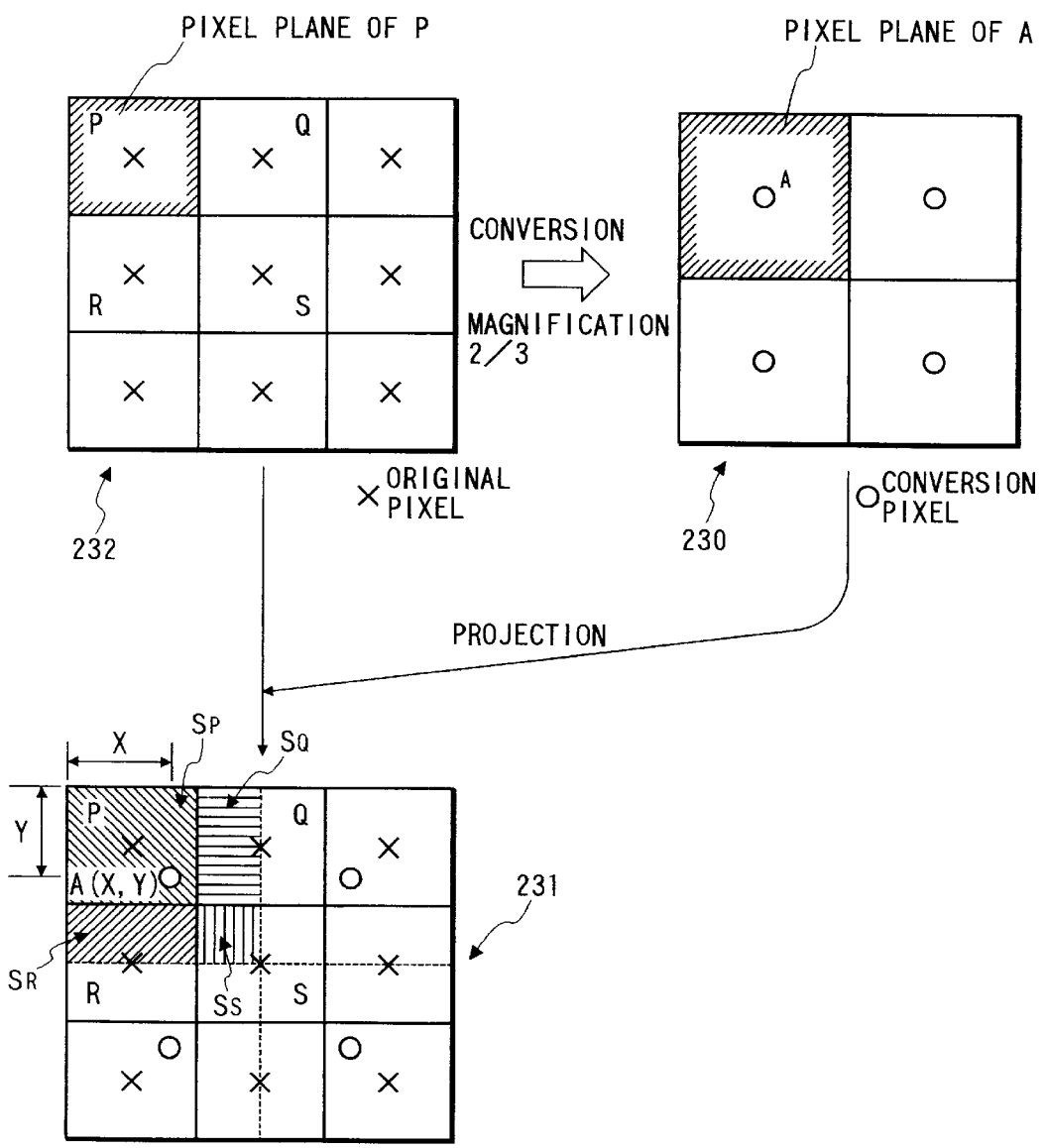
FIG. 22 is a view for explaining the principle of pixel density conversion based on projection in the sixth embodiment.

That is, reference original pixels (corresponding to the pixel values IP, IQ, IR, and IS shown in FIG. 22) required for calculating the conversion pixel value are read out in step S74 in FIG. 21. Subsequently, in step S75, the projected areas (corresponding to the areas SP, SQ, SR, and SS shown in FIG. 22) of the original pixel planes included in the pixel plane of the conversion pixel are calculated. In step S76, equation (1) above is calculated using the values obtained in steps S74 and S75, thus obtaining the mean density as the pixel value of the conversion pixel.

With the processing in steps S74 to S76 above, the Y signal has been subjected to the pixel density conversion processing based on projection.

On the other hand, if it is determined in step S73 that the decoded data of interest is not a Y signal, i.e., is a U or V signal, the flow jumps to step S77, and the signal is subjected to pixel density conversion processing based on simple thinning-out in the second pixel density conversion unit 204.

The pixel density conversion based on simple thinning-out in this embodiment will be described in detail below with reference to FIG. 23. In the following description, assume that the conversion magnification in each of the main scanning direction and subscanning direction is ⅔, and the number of pixels of the original image is 3×3 as in the above-mentioned projection.

Figure 23:
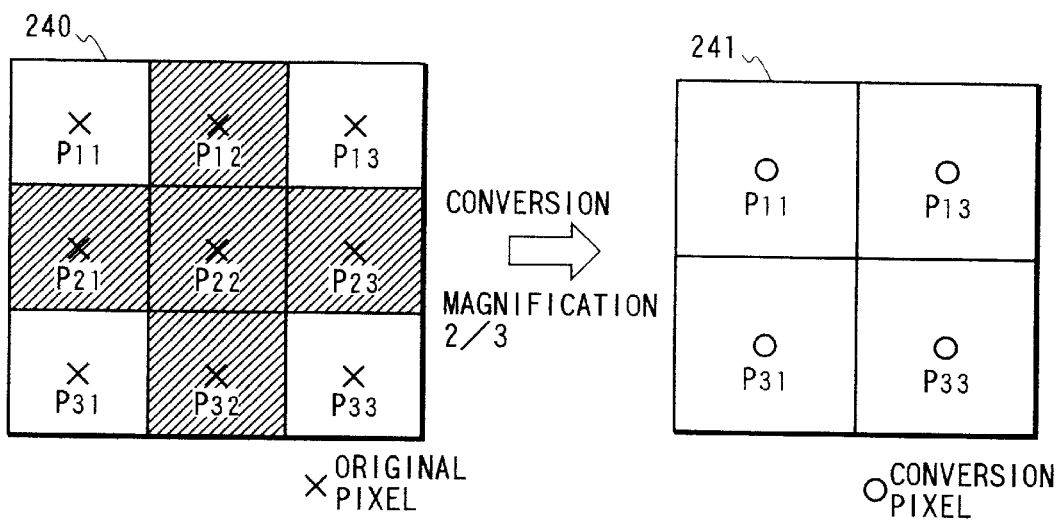
FIG. 23 is a view for explaining the principle of pixel density conversion based on simple thinning-out in the sixth embodiment.

In FIG. 23, hatched pixels of an original image 240 in the main scanning direction and subscanning direction are thinned out to obtain a conversion image 241. As can be seen from the example shown in FIG. 23, the simple thinning-out processing is the simplest one among various pixel density conversion schemes, but suffers most image quality deterioration of the conversion image. In this embodiment, high-speed pixel density conversion based on a simple method at the cost of image quality is performed for color difference component signals (U and V signals) which experience little influence of image quality deterioration due to conversion on the visual sense characteristics of a human being.

Referring back to FIG. 21, Y, U, and V data which have been subjected to the pixel density conversion based on projection or simple thinning-out are subjected to DCT transform and Huffman encoding in the encoding unit 207 in step S78 to obtain JPEG code data. Thereafter, the JPEG code data are stored in the image memory B 208 in step S79.

In step S80, the above-mentioned processing is performed for all the data to be subjected to pixel density conversion processing stored in the image memory A 201.

As described above, according to this embodiment, when pixel density conversion is performed for image data in the YUV color space, the luminance component is subjected to high-quality conversion, and the color difference components are subjected to simple conversion, thus obtaining a sufficiently high-quality conversion image in practice with a smaller circuit scale without arranging any specific arrangement for color space conversion.

In the description of this embodiment, the decoding processing unit 202 decodes JPEG code data to obtain image data (Y, U, and V data) in the YUV color space. However, the present invention is not limited to such specific example. That is, data in other formats such as YIQ data, L*a*b* data, and the like or other encoding schemes may be used or image data which is not encoded may be directly input, as long as image data in the YUV color space can be obtained.

In this embodiment, only the luminance component of image data in the YUV color space is subjected to conversion based on projection. However, the present invention is not limited to such specific example. For example, any other conversion methods may be used as long as they suffer less image quality deterioration by pixel density conversion. Similarly, the conversion method for the color difference components is not limited to simple thinning-out, and any other methods may be used as long as they are simple and can attain high-speed processing. That is, various combinations of pixel density conversion methods for the luminance component and color difference components are available in correspondence with the finally required image quality of the conversion image.

In the description of this embodiment, the conversion magnification is smaller than 1, i.e., reduction conversion is performed. Of course, the present invention can be applied to enlargement conversion. Even in enlargement conversion, a conversion method that places an importance on image quality can be exploited for the luminance component, and a conversion method that places an importance on the processing speed can be used for the color difference components.

In the description of this embodiment, the image data that have been subjected to the pixel density conversion are stored in the image memory B 208. Of course, the present invention can be applied to an image communication device or the like. In this case, JPEG code data stored in the image memory B 208 need only be sent onto a communication line. Likewise, the JPEG code data that have been subjected to the pixel density conversion can be output to and held in an external storage device or the like.

In the sixth embodiment as well, the image processing of the sixth embodiment can be executed in a software manner with the arrangement shown in FIG. 5.

That is, a DSP 42 realizes the processing shown in the flow chart in FIG. 21, i.e., pixel density conversion based on projection for the luminance component and that based on simple thinning-out for the color difference components. The image memory A 201 and the image memory B 208 are assured in an image memory 41 shown in FIG. 5.

Note that the present invention may be applied to either a system made up of a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records program codes of a software program that can realize the functions of the above-mentioned embodiments to the system or apparatus, and reading out and executing the program codes stored in the storage medium by a computer (or a CPU or MPU) of the system or apparatus, needless to say.

In this case, the program codes themselves read out from the storage medium realize the functions of the above-mentioned embodiments, and the storage medium which stores the program codes constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program codes by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

Figure 24:
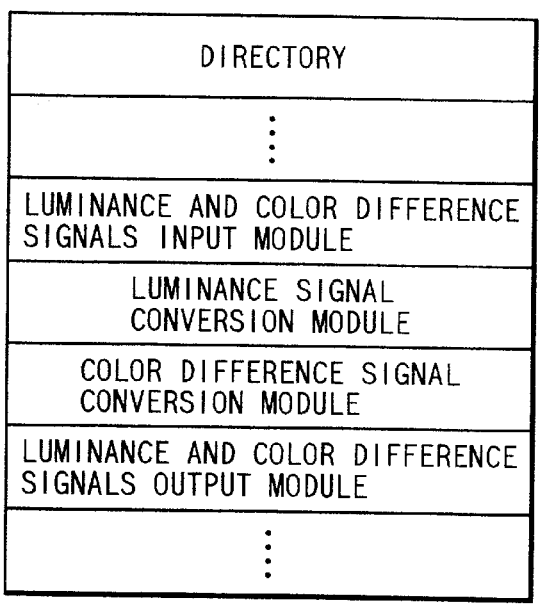
FIG. 24 shows a memory map when the present invention is applied to a recording medium.

When the present invention is applied to the storage medium, the storage medium stores program codes corresponding to the above-mentioned flow charts. In this case, the individual modules shown in the memory map in FIG. 24 are stored in the storage medium. That is, the program codes of at least a "luminance and color difference signals input module", "luminance signal conversion module", "color difference signal conversion module", and "luminance and color difference signals output module" can be stored in the storage medium.

Note that various other changes and modifications of the present invention may be made without departing from the spirit or principal features of the invention.

For example, in the first to fifth embodiments described above, the spatial filtering processing has been exemplified as the contents of image processing. However, the present invention is not limited to such specific processing, but may be applied to any other processing operations such as contrast conversion, as long as they are effective for luminance information of image data.

In the first to sixth embodiments described above, the JPEG scheme has been described as the compression scheme of an image signal. However, the present invention is not limited to such specific scheme, and is effective for any other compression schemes expressed in the YUV color space.

In the above embodiments, the YUV system is used as the color difference system. However, the present invention is not limited to such specific color system, and for example, a $YC_bC_r$ system may be used.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus, comprising:
   a) an input device adapted to input luminance component data and color component data, which are encoded data and together constitute a color image;
   b) a decoder adapted to decode the luminance component data and the color component data into data representing a frequency component;
   c) a dividing unit adapted to separate the luminance component data and the color component data decoded by said decoder;
   d) a first transforming unit adapted to transform the luminance component data separated by said dividing unit into data representing a pixel value;
   e) a processor adapted to perform a correction processing on the luminance component data transformed by said first transforming unit;
   f) a second transforming unit adapted to transform the luminance component data subjected to the correction processing by said processor into data representing the frequency component; and
   g) an output device adapted to multiplex the luminance component data transformed by said second transforming unit and the color component data separated by said dividing unit, and to output the multiplexed data.

2. An apparatus according to claim 1, wherein said processor executes a spatial filtering processing.

3. An apparatus according to claim 1, wherein said processor executes a contrast processing.

4. An apparatus according to claim 1, further comprising a storage unit adapted to store the luminance component data and color component data output from said output device.

5. An apparatus according to claim 1, wherein the luminance component data and color component data input by said input device are data which are encoded with a JPEG encoding method.

6. An apparatus according to claim 3, further comprising an encoder adapted to encode the multiplexed data with the JPEG encoding method.

7. An image processing method, comprising:
   a) an input step, of inputting luminance component data and color component data, which are encoded data and together constitute a color image;
   b) a decoding step, of decoding the luminance component data and the color component data into data representing a frequency component;
   c) a dividing step, of separating the luminance component data and the color component data decoded in said decoding step;
   d) a first transforming step, of transforming the luminance component data separated in said dividing step, into data representing a pixel value;
   e) a processing step, of performing a correction processing on the luminance component data transformed in said first transforming step;
   f) a second transforming step, of transforming the luminance component data subjected to the correction processing in said processing step, into data representing the frequency component; and
   g) an output step, of multiplexing the luminance component data transformed in said second transforming step and the color component data separated in said dividing step, and outputting the multiplexed data.

8. An image processing method, comprising:
   a) an input step, of inputting luminance component data and color component data, which are provided through transform into a frequency component and encoding thereof;
   b) a decoding step, of decoding the luminance component data into data representing a pixel value, wherein the color component data is not subjected to decoding into data representing a pixel value;
   c) a processing step, of performing a correction processing on the luminance component data decoded in said decoding step; and
   d) a re-encoding step, of re-encoding the luminance component data subjected to the correction processing in said processing step.

9. A method according to claim 8, wherein said processing step includes a step of performing a spatial filtering processing.

10. A method according to claim 8, wherein said processing step includes a step of a contrast processing.

11. A method according to claim 8, wherein the luminance component data and the color component data, input in said inputting step, are data which are encoded with a JPEG encoding method.

12. A method according to claim 8, wherein said re-encoding step effects encoding with a JPEG encoding method.

13. An image processing apparatus, comprising:
   a) an input device, adapted to input luminance component data and color component data, which are provided by means of transformation into a frequency component and encoding thereof;
   b) a decoder, arranged to decode the luminance component data into data representing a pixel value, wherein the color component data is not subject to decoding into data representing a pixel value;
   c) a processor, arranged to perform a correction processing on the luminance component data decoded by said decoder; and
   d) a re-encoder, arranged to re-encode the luminance component data subjected to the correction processing by said processor.

* * * * *

UNITED STATES PATENT AND TRADEMARK OFFICE
CERTIFICATE OF CORRECTION

PATENT NO.    : 6,563,946 B2
DATED         : May 13, 2003
INVENTOR(S)   : Masami Kato It is certified that error appears in the above-identified patent and that said Letters Patent is hereby corrected as shown below:

<u>Title page,</u>
Item [56], FOREIGN PATENT DOCUMENTS,
"7143487" should read -- 7-143487 --;
"7322266" should read -- 7-322266 --;
"818979" should read -- 8-18979 --; and
"837663" should read -- 8-37663 --.

Signed and Sealed this

Eleventh Day of November, 2003

JAMES E. ROGAN
*Director of the United States Patent and Trademark Office*